United States Patent
Tang et al.

(10) Patent No.: US 12,173,509 B2
(45) Date of Patent: Dec. 24, 2024

(54) METHOD OF REROOFING

(71) Applicant: Holcim Technology Ltd, Zug (CH)

(72) Inventors: Jiansheng Tang, Carmel, IN (US); Michael J. Hubbard, Goshen, IN (US); Joseph Kalwara, Indianapolis, IN (US); Carl E. Watkins, Jr., Mount Juliet, TN (US); Brian Alexander, Westfield, IN (US); Todd D. Taykowski, Lebanon, TN (US); Joseph R. Carr, Indianapolis, IN (US)

(73) Assignee: Holcim Technology Ltd, Zug (CH)

( * ) Notice: Subject to any disclaimer, the term of this patent is extended or adjusted under 35 U.S.C. 154(b) by 0 days.

(21) Appl. No.: 18/311,040

(22) Filed: May 2, 2023

(65) Prior Publication Data
US 2023/0272619 A1    Aug. 31, 2023

Related U.S. Application Data

(63) Continuation of application No. 16/088,176, filed as application No. PCT/US2017/024192 on Mar. 25, 2017, now abandoned.

(60) Provisional application No. 62/313,239, filed on Mar. 25, 2016.

(51) Int. Cl.
| | |
|---|---|
| *E04D 5/14* | (2006.01) |
| *B32B 7/12* | (2006.01) |
| *B32B 27/10* | (2006.01) |
| *B32B 27/32* | (2006.01) |
| *E04D 1/34* | (2006.01) |
| *E04D 5/06* | (2006.01) |

(52) U.S. Cl.
CPC ............... *E04D 5/148* (2013.01); *B32B 7/12* (2013.01); *B32B 27/10* (2013.01); *B32B 27/32* (2013.01); *E04D 5/06* (2013.01); *B32B 2405/00* (2013.01); *B32B 2419/06* (2013.01)

(58) Field of Classification Search
None
See application file for complete search history.

(56) References Cited

U.S. PATENT DOCUMENTS

| | | | |
|---|---|---|---|
| 3,935,353 A | | 1/1976 | Doerfling et al. |
| 4,032,491 A | * | 6/1977 | Schoenke .......... C09D 153/025 524/68 |
| 4,404,243 A | | 9/1983 | Terpay |
| 4,585,682 A | | 4/1986 | Colarusso et al. |
| 4,657,958 A | | 4/1987 | Fieldhouse et al. |

(Continued)

FOREIGN PATENT DOCUMENTS

| | | |
|---|---|---|
| CA | 2809955 A1 | 5/2013 |
| DE | 19945732 A1 | 4/2001 |

(Continued)

OTHER PUBLICATIONS

Translation of WO 2006108509 A1.
(Continued)

*Primary Examiner* — Phi D A
(74) *Attorney, Agent, or Firm* — Renner, Kenner; Arthur M. Reginelli

(57) ABSTRACT

A method of reroofing, the method comprising of applying to an existing roof surface a membrane composite including a pre-applied adhesive layer by mating the adhesive layer to the existing membrane.

8 Claims, 3 Drawing Sheets

(56) References Cited

U.S. PATENT DOCUMENTS

| | | |
|---|---|---|
| 4,732,925 A | 3/1988 | Davis |
| 4,778,852 A | 10/1988 | Futamura |
| 4,806,400 A | 2/1989 | Sancaktar |
| 4,810,565 A | 3/1989 | Wasitis et al. |
| 4,908,229 A | 3/1990 | Kissel |
| 4,943,461 A | 7/1990 | Karim |
| 5,073,611 A | 12/1991 | Rehmer et al. |
| 5,086,088 A | 2/1992 | Kitano et al. |
| 5,128,386 A | 7/1992 | Rehmer et al. |
| 5,242,727 A | 9/1993 | Briddell et al. |
| 5,253,461 A | 10/1993 | Janoski et al. |
| 5,264,533 A | 11/1993 | Rehmer et al. |
| 5,317,035 A | 5/1994 | Jacoby et al. |
| 5,374,477 A | 12/1994 | Lawless et al. |
| 5,389,699 A | 2/1995 | Rehmer et al. |
| 5,389,715 A | 2/1995 | Davis et al. |
| 5,456,785 A | 10/1995 | Venable |
| 5,496,615 A | 3/1996 | Bartlett et al. |
| 5,573,092 A | 11/1996 | Gabilondo |
| 5,665,822 A | 9/1997 | Bitler et al. |
| 5,686,179 A | 11/1997 | Cotsakis |
| 5,849,133 A | 12/1998 | Senderling et al. |
| 5,880,241 A | 3/1999 | Brookhart et al. |
| 5,891,563 A | 4/1999 | Letts |
| 5,895,301 A | 4/1999 | Porter et al. |
| RE36,674 E | 4/2000 | Gluck et al. |
| 6,044,604 A | 4/2000 | Clayton et al. |
| 6,080,818 A | 6/2000 | Thakker et al. |
| 6,117,375 A | 9/2000 | Garrett et al. |
| 6,120,869 A | 9/2000 | Cotsakis et al. |
| 6,184,496 B1 | 2/2001 | Pearce |
| 6,192,650 B1 * | 2/2001 | Kittson ............... C09J 7/30 52/746.1 |
| 6,218,493 B1 | 4/2001 | Johnson et al. |
| 6,262,144 B1 | 7/2001 | Zhao et al. |
| 6,284,360 B1 | 9/2001 | Johnson |
| 6,297,324 B1 | 10/2001 | Briddell et al. |
| 6,299,936 B1 | 10/2001 | Reck et al. |
| 6,306,460 B1 | 10/2001 | Reck et al. |
| 6,310,163 B1 | 10/2001 | Brookhart et al. |
| 6,348,530 B1 | 2/2002 | Reck et al. |
| 6,355,701 B1 | 3/2002 | Soukup et al. |
| RE37,683 E | 4/2002 | Briddell et al. |
| 6,502,360 B2 | 1/2003 | Carr, III et al. |
| 6,569,970 B2 | 5/2003 | Reck et al. |
| 6,586,080 B1 | 7/2003 | Heifetz |
| 6,605,662 B2 | 8/2003 | Zhao et al. |
| 6,641,896 B2 | 11/2003 | Fensel et al. |
| 6,683,126 B2 | 1/2004 | Keller et al. |
| 6,720,399 B2 | 4/2004 | Husemann |
| 6,753,079 B2 | 6/2004 | Husemann |
| 6,764,733 B1 | 7/2004 | Clarke |
| 6,774,071 B2 | 8/2004 | Horner, Jr. et al. |
| 6,776,322 B2 | 8/2004 | Villela et al. |
| 6,790,520 B1 | 9/2004 | Todd et al. |
| 6,794,449 B2 | 9/2004 | Fisher |
| 6,813,866 B2 | 11/2004 | Naipawer, III |
| 6,828,020 B2 | 12/2004 | Fisher et al. |
| 6,831,114 B2 | 12/2004 | Husemann |
| 6,841,608 B1 | 1/2005 | Dreher et al. |
| 6,858,315 B2 | 2/2005 | Khan et al. |
| 6,863,944 B2 | 3/2005 | Naipawer, III et al. |
| 6,881,442 B2 | 4/2005 | Husemann |
| 6,887,917 B2 | 5/2005 | Yang et al. |
| 6,895,724 B2 | 5/2005 | Naipawer, III |
| 6,901,712 B2 | 6/2005 | Lionel |
| 7,066,371 B2 | 6/2006 | Villela et al. |
| 7,101,598 B2 | 9/2006 | Hubbard |
| 7,115,313 B2 | 10/2006 | Zanchetta et al. |
| 7,132,143 B2 | 11/2006 | Zanchetta et al. |
| 7,148,160 B2 | 12/2006 | Porter |
| 7,175,732 B2 | 2/2007 | Robison et al. |
| 7,238,732 B2 | 7/2007 | Bamborough et al. |
| 7,304,119 B2 | 12/2007 | Balzer |
| 7,323,242 B2 | 1/2008 | Gerst et al. |
| 7,358,319 B2 | 4/2008 | Balzer et al. |
| 7,368,155 B2 | 5/2008 | Larson et al. |
| 7,387,753 B2 | 6/2008 | Tackett et al. |
| 7,473,734 B2 | 1/2009 | Beckley et al. |
| 7,517,934 B2 | 4/2009 | Deeter et al. |
| 7,575,653 B2 | 8/2009 | Johnson et al. |
| 7,589,145 B2 | 9/2009 | Brant et al. |
| 7,612,120 B2 | 11/2009 | Letts |
| 7,614,194 B2 | 11/2009 | Shah |
| 7,645,829 B2 | 1/2010 | Tse et al. |
| 7,744,998 B2 | 6/2010 | Nakamuta |
| 7,771,807 B2 | 8/2010 | Hubbard |
| 7,776,417 B2 | 8/2010 | Mohseen et al. |
| 7,838,568 B2 | 11/2010 | Letts et al. |
| 7,914,868 B2 | 3/2011 | Naipawer, III et al. |
| 8,063,141 B2 | 11/2011 | Fisher |
| 8,153,220 B2 | 4/2012 | Nebesnak et al. |
| 8,202,596 B2 | 6/2012 | Yang et al. |
| 8,206,817 B2 | 6/2012 | Donovan et al. |
| 8,241,446 B2 | 8/2012 | Naipawer, III et al. |
| 8,262,833 B2 | 9/2012 | Dyal et al. |
| 8,327,594 B2 | 12/2012 | Merryman et al. |
| 8,329,800 B2 | 12/2012 | Terrenoire et al. |
| 8,381,450 B2 | 2/2013 | Cummings et al. |
| 8,389,103 B2 | 3/2013 | Kiik et al. |
| 8,399,571 B2 | 3/2013 | Becker et al. |
| 8,492,472 B2 | 7/2013 | Elizalde et al. |
| 8,530,582 B2 | 9/2013 | Becker et al. |
| 10,132,082 B2 | 11/2018 | Tang et al. |
| 10,370,854 B2 | 8/2019 | Tang et al. |
| 10,519,663 B2 | 12/2019 | Tang et al. |
| 2001/0023264 A1 | 9/2001 | Yamamoto |
| 2002/0013379 A1 | 1/2002 | Singh |
| 2003/0032351 A1 | 2/2003 | Horner, Jr. |
| 2003/0032691 A1 | 2/2003 | Bolte |
| 2003/0082365 A1 | 5/2003 | Geary |
| 2003/0153656 A1 | 8/2003 | Sjerps |
| 2003/0215594 A1 | 11/2003 | Hamdar |
| 2004/0103608 A1 | 6/2004 | Borenstein |
| 2004/0109983 A1 | 6/2004 | Rotter |
| 2004/0191508 A1 | 9/2004 | Hubbard |
| 2004/0242763 A1 | 12/2004 | Tielemans |
| 2005/0097857 A1 | 5/2005 | Mehta et al. |
| 2005/0214496 A1 | 9/2005 | Borenstein |
| 2006/0017974 A1 | 1/2006 | Shapovalov |
| 2006/0100408 A1 | 5/2006 | Powell |
| 2006/0127627 A1 | 6/2006 | Larson et al. |
| 2006/0216523 A1 | 9/2006 | Takaki |
| 2007/0054088 A1 | 3/2007 | Matijasic et al. |
| 2007/0207284 A1 | 9/2007 | McClintic |
| 2007/0281119 A1 | 12/2007 | Di Stefano |
| 2008/0088056 A1 | 4/2008 | Vavra |
| 2010/0075092 A1 | 3/2010 | Kendra et al. |
| 2010/0086712 A1 | 4/2010 | Moller |
| 2010/0200148 A1 | 8/2010 | Douglas |
| 2010/0279049 A1 | 11/2010 | Hubbard |
| 2010/0292403 A1 | 11/2010 | Ansems |
| 2011/0048513 A1 | 3/2011 | Booth |
| 2011/0017391 A1 | 7/2011 | Franklin et al. |
| 2012/0240996 A1 | 9/2012 | Keiser |
| 2013/0012287 A1 | 1/2013 | Al Ani |
| 2013/0122287 A1 | 5/2013 | Moeller |
| 2013/0184393 A1 | 7/2013 | Satrijo |
| 2013/0225020 A1 | 8/2013 | Flood |
| 2016/0230392 A1 * | 8/2016 | Tang .................... C09J 7/22 |
| 2017/0015083 A1 | 1/2017 | Tang et al. |
| 2017/0044406 A1 | 2/2017 | Hubbard et al. |
| 2017/0096588 A1 | 4/2017 | Demoulin et al. |
| 2017/0114543 A1 | 4/2017 | Tang et al. |
| 2017/0210091 A1 * | 7/2017 | McJunkins .............. B32B 7/06 |
| 2019/0316359 A1 | 10/2019 | Tang et al. |

FOREIGN PATENT DOCUMENTS

| | | |
|---|---|---|
| EP | 0342811 B1 | 7/1995 |
| EP | 1548080 B1 | 6/2005 |
| EP | 2439062 A1 | 4/2012 |
| GB | 2305667 A | 4/1997 |
| JP | 2004002577 | 1/2004 |

(56) References Cited

FOREIGN PATENT DOCUMENTS

| | | |
|---|---|---|
| JP | 2004003225 | 1/2004 |
| WO | 199856866 A1 | 12/1998 |
| WO | 199924290 A1 | 5/1999 |
| WO | 2006084134 A1 | 8/2006 |
| WO | 2006108509 A1 | 10/2006 |
| WO | 2013142562 A2 | 9/2013 |
| WO | 2015042258 A1 | 3/2015 |
| WO | 2015134889 A1 | 9/2015 |
| WO | 2017049280 A1 | 3/2017 |
| WO | 2017165868 A1 | 9/2017 |
| WO | 2017165870 A1 | 9/2017 |
| WO | 2017165871 A1 | 9/2017 |

OTHER PUBLICATIONS

Translation of JP 2004003225.
Translation of JP 2004002577.
Translation of EP 1548080 B1.
Translation of EP 2439062 A1.
European Standard EN 13956:2012.
Technical Datasheet of RoofSea/OneStep tape.
Technical Datasheet of Sika Sarnafil G410 SA Flashing Membrane.

* cited by examiner

METHOD OF REROOFING

This application is a continuation application of U.S. application Ser. No. 16/088,176 filed on Sep. 25, 2018, which is a national-stage application of PCT/US2017/024192 filed on Mar. 25, 2017, which claims the benefit of U.S. Provisional Application No. 62/313,239 filed on Mar. 25, 2016, which are incorporated herein by reference.

FIELD OF THE INVENTION

Embodiments of the invention are directed toward methods of reroofing wherein a membrane carrying a factory-applied adhesive is applied directly to an existing membrane and/or additional substrates that are installed on the roof as part of the roofing event such as coverboards.

BACKGROUND OF THE INVENTION

Large, flexible polymeric sheets, which are often referred to as membranes or panels, are used in the construction industry to cover flat or low-sloped roofs. These membranes provide protection to the roof from the environment, particularly in the form of a waterproof barrier. As is known in the art, commercially popular membranes include thermoset membranes such as those including cured EPDM (i.e., ethylene-propylene-diene terpolymer rubber) or thermoplastics such as TPO (i.e., thermoplastic olefins).

These membranes are typically delivered to a construction site in a bundled roll, transferred to the roof, and then unrolled and positioned. The sheets are then affixed to the building structure by employing varying techniques such as mechanical fastening, ballasting, and/or adhesively adhering the membrane to the roof. The roof substrate to which the membrane is secured may be one of a variety of materials depending on the installation site and structural concerns. For example, the surface may be a concrete, metal, or wood deck, it may include insulation or recover board, and/or it may include an existing membrane.

In addition to securing the membrane to the roof—which mode of attachment primarily seeks to prevent wind uplift—the individual membrane panels, together with flashing and other accessories, are positioned and adjoined to achieve a waterproof barrier on the roof. Typically, the edges of adjoining panels are overlapped, and these overlapping portions are adjoined to one another through a number of methods depending upon the membrane materials and exterior conditions. One approach involves providing adhesives or adhesive tapes between the overlapping portions, thereby creating a water resistant seal.

With respect to the former mode of attachment, which involves securing the membrane to the roof, the use of adhesives allow for the formation of a fully-adhered roofing system. In other words, a majority, if not all, of the membrane panel is secured to the roof substrate, as opposed to mechanical attachment methods that can only achieve direct attachment in those locations where a mechanical fastener actually affixes the membrane.

When adhesively securing a membrane to a roof, such as in the formation of a fully-adhered system, there are a few common methods employed. The first is known as contact bonding whereby technicians coat both the membrane and the substrate with an adhesive, and then mate the membrane to the substrate while the adhesive is only partially set. Because the volatile components (e.g. solvent) of the adhesives are flashed off prior to mating, good early (green) bond strength is developed.

Another mode of attachment is through the use of a pre-applied adhesive to the bottom surface of the membrane. In other words, prior to delivery of the membrane to the job site, an adhesive is applied to the bottom surface of the membrane. In order to allow the membrane to be rolled and shipped, a release film or member is applied to the surface of the adhesive. During installation of the membrane, the release member is removed, thereby exposing the pressure-sensitive adhesive, and the membrane can then be secured to the roofing surface without the need for the application of additional adhesives.

As is known in the art, the pre-applied adhesive can be applied to the surface of the membrane in the form of a hot-melt adhesive. For example, U.S. Publication No. 2004/0191508, which teaches peel and stick thermoplastic membranes, employs pressure-sensitive adhesive compositions comprising styrene-ethylene-butylene-styrene (SEBS), tackifying endblock resins such as cumarone-indene resin and tackifying midblock resins such as terpene resins. This publication also suggests other hot-melt adhesives such as butyl-based adhesives, EPDM-based adhesives, acrylic adhesives, styrene-butadiene adhesives, polyisobutylene adhesives, and ethylene vinyl acetate adhesives.

In view of the nature of the adhesives, peel and stick membranes have inherent limitations. For example, there are temperature windows that limit the minimum temperature at which the membranes can be installed on a roof surface. Also, there are maximum temperature limits on the roof surface that the adhesive can withstand while maintaining wind-uplift integrity. With respect to the latter, where the surface temperature on the roof nears the glass transition temperature of the adhesive, the adhesive strength offered by the pressure-sensitive adhesive is not maintained. As a result, peel-and-stick membranes have not gained wide acceptance in the industry. Moreover, the use of peel-and-stick membranes has been limited to use in conjunction with white membranes (e.g., white thermoplastic membranes) because the surface temperature of these membranes remains cooler when exposed to solar energy.

Reroofing an existing roof generally includes the application of a newly fabricated membrane over the existing membrane. Reroofing presents challenges, especially where there is a desire to fully adhere the new membrane to an existing membrane, because the existing roof surface can provide an undesirable substrate for adhesive attachment. For example, the roof surface can be environmentally damaged, covered with debris, and/or can be relatively uneven.

SUMMARY OF THE INVENTION

Embodiments of the present invention provide a method of reroofing, the method comprising of applying to an existing roof surface a membrane composite including a pre-applied adhesive layer by mating the adhesive layer to the existing membrane.

DETAILED DESCRIPTION OF ILLUSTRATIVE EMBODIMENTS

Embodiments of the invention are based, at least in part, on the discovery of reroofing technique that includes the application of membrane having a pre-applied (e.g. factory-applied) pressure-sensitive adhesive that is at least partially cured directly to an existing membrane secured to the roof being reroofed. In one or more embodiments, the pre-applied adhesive is applied as a hot-melt adhesive and subsequently cured. It has unexpectedly been discovered that the nature of the pre-applied adhesive, including its initial tack and high-temperature strength, allows the membrane composite to be directly attached to the existing membrane.

Membrane Construction

Practice of the present invention does not necessarily change the overall construction of the membranes of the present invention. As the skilled person understands, membranes that carry an adhesive for application by peel-and-stick methods are generally known as disclosed in U.S. Publication No. 2004/0191508, which is incorporated herein by reference.

Figure 1:
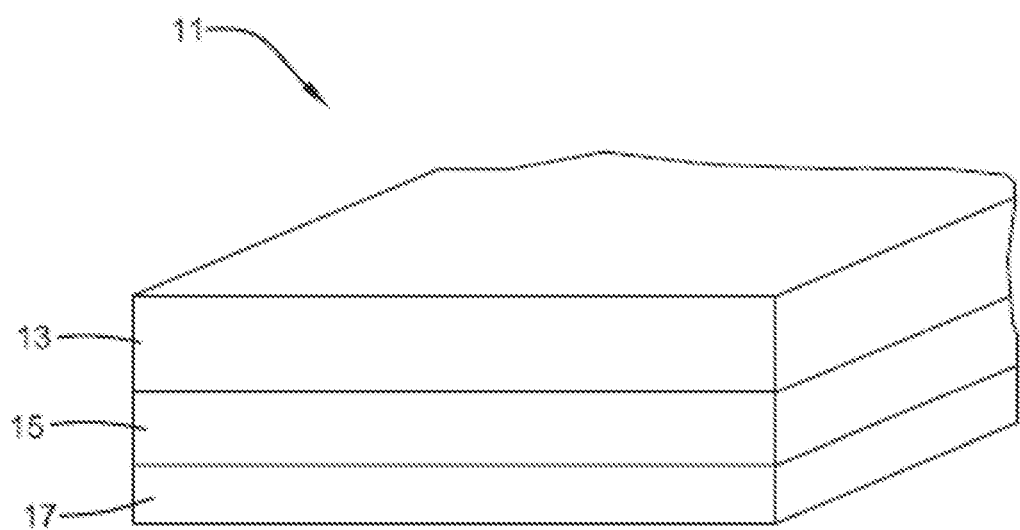
FIG. 1 is a cross-section perspective view of a membrane composite according to embodiments of the invention.

For example, a membrane 11, which may be referred to as a membrane composite 11, is shown in FIG. 1. Membrane composite 11 includes polymeric panel 13, pressure-sensitive adhesive layer 15, and release member 17 removably attached to layer 15.

Membrane Panel

In one or more embodiments, the membrane may be a thermoset material. In other embodiments the membrane may be a thermoformable material. In one or more embodiments, the membrane may be EPDM based. In other embodiments, the membrane may be TPO based. In these or other embodiments, the membrane may be flexible and capable of being rolled up for shipment. In these or other embodiments, the membrane may include fiber reinforcement, such as a scrim. In one or more embodiments, the membrane includes EPDM membranes including those that meet the specifications of the ASTM D-4637. In other embodiments, the membrane includes thermoplastic membranes including those that meet the specifications of ASTM D-6878-03. Still other membranes may include PVC, TPV, CSPE, and asphalt-based membranes.

In one or more embodiments, the roofing membrane panels are characterized by conventional dimensions. For example, in one or more embodiments, the membrane panels may have a thickness of from about 500 μm to about 3 mm, in other embodiments from about 1,000 μm to about 2.5 mm, and in other embodiments from about 1,500 μm to about 2 mm. In these or other embodiments, the membrane panels of the present invention are characterized by a width of about 1 m to about 20 m, in other embodiments from about 2 m to about 18 m, and in other embodiments from about 3 m to about 15 m.

Hot-Melt Curable Adhesives

In one or more embodiments, the pressure-sensitive adhesive layer (e.g. layer 23) is a cured pressure-sensitive adhesive. In sub-embodiments thereof, this cured pressure-sensitive adhesive layer is formed from a curable hot-melt adhesive. In other words, and as will be described in greater detail below, an uncured adhesive composition is applied to the membrane as a hot-melt composition (i.e. the composition is heated and applied as a flowable composition in the absence or appreciable absence of solvent), and then the composition is subsequently crosslinked (i.e. cured) to form the cured pressure-sensitive layer.

In one or more embodiments, the cured pressure-sensitive adhesive layer may be an acrylic-based hot-melt adhesive. In one or more embodiments, the adhesive is a polyacrylate such as a polyacrylate elastomer. In one or more embodiments, useful polyacrylates include one or more units defined by the formula:

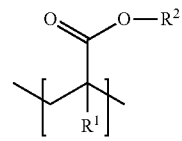

where each $R^1$ is individually hydrogen or a hydrocarbyl group and each $R^2$ is individually a hydrocarbyl group. In the case of a homopolymer, each $R^1$ and $R^2$, respectively, throughout the polymer are same in each unit. In the case of a copolymer, at least two different $R^1$ and/or two different $R^2$ are present in the polymer chain.

In one or more embodiments, hydrocarbyl groups include, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms. In particular embodiments, each $R^2$ is an alkyl group having at least 4 carbon atoms. In particular embodiments, $R^1$ is hydrogen and $R^2$ is selected from the group consisting of butyl, 2-ethylhexyl, and mixtures thereof.

In one or more embodiments, the polyacrylate elastomers that are useful as adhesives in the practice of this invention may be characterized by a glass transition temperature (Tg) of less than 0° C., in other embodiments less than −20° C., in other embodiments less than −30° C. In these or other embodiments, useful polyacrylates may be characterized by a Tg of from about −70 to about 0° C., in other embodiments from about −50 to about −10° C., and in other embodiments from about −40 to about −20° C.

In one or more embodiments, the polyacrylate elastomers that are useful as adhesives in the practice of this invention may be characterized by a number average molecular weight of from about 90 to about 800 kg/mole, in other embodiments from about 100 to about 350 kg/mole, in other embodiments from about 100 to about 700 kg/mole, in other embodiments from about 150 to about 270 kg/mole, in other embodiments from about 120 to about 600 kg/mole, and in other embodiments from about 180 to about 250 kg/mole.

In one or more embodiments, the polyacrylate elastomers that are useful as adhesives in the practice of this invention may be characterized by a Brookfield viscosity at 150° C. of from about 10,000 to about 200,000 cps, in other embodiments from about 30,000 to about 60,000 cps, in other embodiments from about 30,000 to about 170,000 cps, in other embodiments from about 25,000 to about 150,000 cps, in other embodiments from about 30,000 to about 60,000 cps, and in other embodiments from about 40,000 to about 50,000 cps.

Specific examples of polyacrylate elastomers that are useful as adhesives in the practice of the present invention include poly(butylacrylate), and poly(2-ethylhexylacrylate). These polyacrylate elastomers may be formulated with photoinitiators, solvents, plasticizers, and resins such as natural and hydrocarbon resins. The skilled person can readily formulate a desirable adhesive composition. Useful adhesive compositions are disclosed, for example, in U.S. Pat. Nos. 6,720,399, 6,753,079, 6,831,114, 6,881,442, and 6,887,917, which are incorporated herein by reference.

In other embodiments, the polyacrylate elastomers may include polymerized units that serve as photoinitiators. These units may derive from copolymerizable photoinitiators including acetophenone or benzophenone derivatives. These polyacrylate elastomers and the adhesive compositions formed therefrom are known as disclosed in U.S. Pat. Nos. 7,304,119 and 7,358,319, which are incorporated herein by reference.

Useful adhesive compositions are commercially available in the art. For example, useful adhesives include those available under the tradename acResin (BASF), those available under the tradename AroCure (Ashland Chemical), and NovaMeltRC (NovaMelt). In one or more embodiments, these hot-melt adhesives may be cured (i.e., crosslinked) by UV light.

In one or more embodiments, the hot-melt adhesive is at least partially cured after being applied to the membrane, as will be discussed in greater detail below. In one or more embodiments, the adhesive is cured to an extent that it is not thermally processable in the form it was prior to cure. In these or other embodiments, the cured adhesive is characterized by a cross-linked infinite polymer network. While at least partially cured, the adhesive layer of one or more embodiments is essentially free of curative residue such as sulfur or sulfur crosslinks and/or phenolic compounds or phenolic-residue crosslinks.

As indicated above, the pressure-sensitive adhesive, in its cured stated, provides sufficient tack to allow the membrane composites of this invention to be used in roofing systems that meet industry standards for wind uplift resistance. In one or more embodiments, this tack may be quantified based upon the peel strength when adhered to another membrane in accordance with ASTM D-1876-08. In one or more embodiments, the cured pressure-sensitive adhesive of the present invention is characterized by a peel strength, according to ASTM D-1876-08, of at least 1.8 lbf/in, in other embodiments at least 3.6 lbf/in, in other embodiments at least 8.0 lbf/in, in other embodiments at least 15 lbf/in, and in other embodiments at least 20 lbf/in.

Similarly, the tack of the pressure-sensitive adhesive, in its cured state, may be quantified based upon the peel strength when adhered to a construction board (e.g. insulation board) having a kraft paper facer in accordance with ASTM D-903-98 (2010). In one or more embodiments, the cured pressure-sensitive adhesive of the present invention is characterized by a peel strength, according to ASTM D-903-98 (2010) using an insulation board with kraft paper facer, of at least 1.5 lbf/in, in other embodiments at least 2.0 lbf/in, in other embodiments at least 2.5 lbf/in, in other embodiments at least 3.0 lbf/in, and in other embodiments at least 3.5 lbf/in.

Release Member

In one or more embodiments, release member 17 may include a polymeric film or extrudate, or in other embodiments it may include a cellulosic substrate. Where the polymeric film and/or cellulosic substrate cannot be readily removed after being attached to the asphaltic component, the polymeric film and/or cellulosic substrate can carry a coating or layer that allows the polymeric film and/or cellulosic substrate to be readily removed from the asphaltic component after attachment. This polymeric film or extrudate may include a single polymeric layer or may include two or more polymeric layers laminated or coextruded to one another.

Suitable materials for forming a release member that is a polymeric film or extrudate include polypropylene, polyester, high-density polyethylene, medium-density polyethylene, low-density polyethylene, polystyrene or high-impact polystyrene. The coating or layer applied to the film and/or cellulosic substrate may include a silicon-containing or fluorine-containing coating. For example, a silicone oil or polysiloxane may be applied as a coating. In other embodiments, hydrocarbon waxes may be applied as a coating. As the skilled person will appreciate, the coating, which may be referred to as a release coating, can be applied to both planar surfaces of the film and/or cellulosic substrate. In other embodiments, the release coating need only be applied to the planar surface of the film and/or cellulosic substrate that is ultimately removably mated with the asphaltic component.

In one or more embodiments, the release member is characterized by a thickness of from about 15 to about 80, in other embodiments from about 18 to about 75, and in other embodiments from about 20 to about 50 µm.

Preparation of Membrane Composite

The membrane panels employed in the membrane composites of the present invention may be prepared by conventional techniques. For example, thermoplastic membrane panels may be formed by the extrusion of thermoplastic compositions into one or more layers that can be laminated into a membrane panel. Thermoset membranes can be formed using known calendering and curing techniques. Alternatively, thermoset membranes can be made by continuous process such as those disclosed in WO 2013/142562, which is incorporated herein by reference. Once the membrane is formed, the curable hot-melt adhesive can be extruded onto the membrane by using known apparatus such as adhesive coaters. The adhesive can then subsequently be cured by using, for example, UV radiation. The release film can be applied to the adhesive layer, and the membrane can then be subsequently rolled for storage and/or shipment. Advantageously, where the membrane panel is made by using continuous techniques, the process can be supplemented with continuous techniques for applying and curing the adhesive coatings according to embodiments of the present invention to thereby prepare usable membrane composites within a single continuous process.

Figure 2:
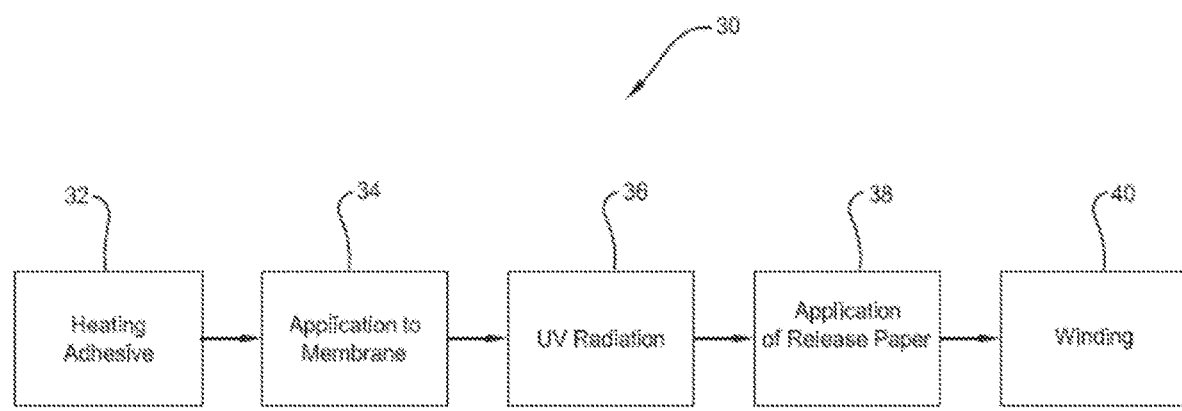
FIG. 2 is a flow chart describing a process for making membrane composite according to embodiments of the present invention.

As generally shown in FIG. 2, process 30 for preparing a composite membrane according to the present invention generally begins with a step of heating 32, wherein a pressure-sensitive adhesive is heated to a sufficient temperature to allow the adhesive to be applied as a coating within a coating step 34. Within coating step 34, the adhesive is applied to the membrane to form a coating layer. Following formation of the coating, the coating is subjected to a UV-curing step 36 where sufficient UV energy is applied to the coating to thereby effect a desirable curing or crosslinking of the adhesive. Once the adhesive has been sufficiently cured by exposure to UV curing step 36, a release member can be applied to the cured coating in a member application step 38. Following application of a member, the composite is wound into a roll at winding step 40.

In one or more embodiments, heating step 32 heats the adhesive to a temperature of from about 120 to about 160° C., in other embodiments from about 125 to about 155° C., and in other embodiments from about 130 to about 150° C.

In one or more embodiments, coating step 34 applies an adhesive to the surface of a membrane to form a coating layer of adhesive that has a thickness of at least 51 µm (2 mil), in other embodiments at least 102 µm (4 mil), in other embodiments at least 127 μm (5 mil), and in other embodiments at least 152 μm (6 mil). In one or more embodiments, coating step 34 applies an adhesive to the surface of a membrane to form a coating layer of adhesive that has a thickness of from about 51 to about 381 μm (about 2 to about 15 mil), in other embodiments from about 102 to about 305 μm (about 4 to about 12 mil), and in other embodiments from about 127 to about 254 μm (about 5 to about 10 mil). In one or more embodiments, the coating has a uniform thickness such that the thickness of the coating at any given point on the surface of the membrane does not vary by more than 51 μm (2 mil), in other embodiments by more than 38 μm (1.5 mil), and in other embodiments by more than 25 μm (1 mil).

In one or more embodiments, UV curing step 36 subjects the adhesive coating to a UV dosage of from about 30 to about 380 millijoule/cm$^2$, in other embodiments from about 35 to about 300 millijoule/cm$^2$, in other embodiments from about 40 to about 280 millijoule/cm$^2$, in other embodiments from about 45 to about 240 millijoule/cm$^2$, and in other embodiments from about 48 to about 235 millijoule/cm$^2$. It has advantageously been discovered that the required dosage of energy can be exceeded without having a deleterious impact on the adhesives of the present invention. For example, up to ten times, in other embodiments up to five times, and in other embodiments up to three times the required dosage can be applied to the coating composition without having a deleterious impact on the coating composition and/or its use in the present invention.

In one or more embodiments, UV curing step 36 subjects the adhesive coating to a UV intensity, which may also be referred to as UV irradiance, of at least 150, in other embodiments at least 200, and in other embodiments at least 250 milliWatts/cm$^2$. In these or other embodiments, UV curing step 36 subjects the adhesive coating to a UV intensity of from about 150 to about 500 milliWatts/cm$^2$, in other embodiments from about 200 to about 400 milliWatts/cm$^2$, and in other embodiments from about 250 to about 350 milliWatts/cm$^2$. It has advantageously been discovered that the ability to appropriately cure the coating compositions of the present invention, and thereby provide a useful pressure-sensitive adhesive for the roofing applications disclosed herein, critically relies on the UV intensity applied to the coating. It is believed that the thickness of the coatings (and therefore the thickness of the pressure-sensitive adhesive layer) employed in the present invention necessitates the application of greater UV intensity.

In one or more embodiments, the energy supplied to the coating layer within UV radiation step 36 is in the form of UV-C electromagnetic radiation, which can be characterized by a wave length of from about 250 to about 260 nm. In one or more embodiments, the UV dosage applied during UV curing step 36 is regulated based upon a UV measuring and control system that operates in conjunction with UV curing step 36. According to this system, UV measurements are taken proximate to the surface of the adhesive coating layer using known equipment such as a UV radiometer. The data from these measurements can be automatically inputted into a central processing system that can process the information relative to desired dosage and/or cure states and automatically send signal to various variable-control systems that can manipulate one or more process parameters. For example, the power supplied to the UV lamps and/or the height to which the UV lamps are positioned above the coating layer can be manipulated automatically based upon electronic signal from the central processing unit. In other words, the UV intensity, and therefore the UV dosage, can be adjusted in real time during the manufacturing process.

In one or more embodiments, an exemplary process for preparing the membrane composites of the present invention can be described with reference to FIG. 3. Continuous process 50 includes a heating step 52 where UV curable hot-melt adhesive 51 is heated to a desired temperature within a heated tank 53. Adhesive 51 is fed into an extrusion device, such as a coater 55, which may include a pump, such as a gear pump 57, and a slot die 59. Within coating step 54, coater 55 extrudes adhesive 51, which is in its molten, liquid or flowable state, and deposits a coating layer 61 of adhesive 51 onto a planar surface 63 of membrane 65.

Figure 3:
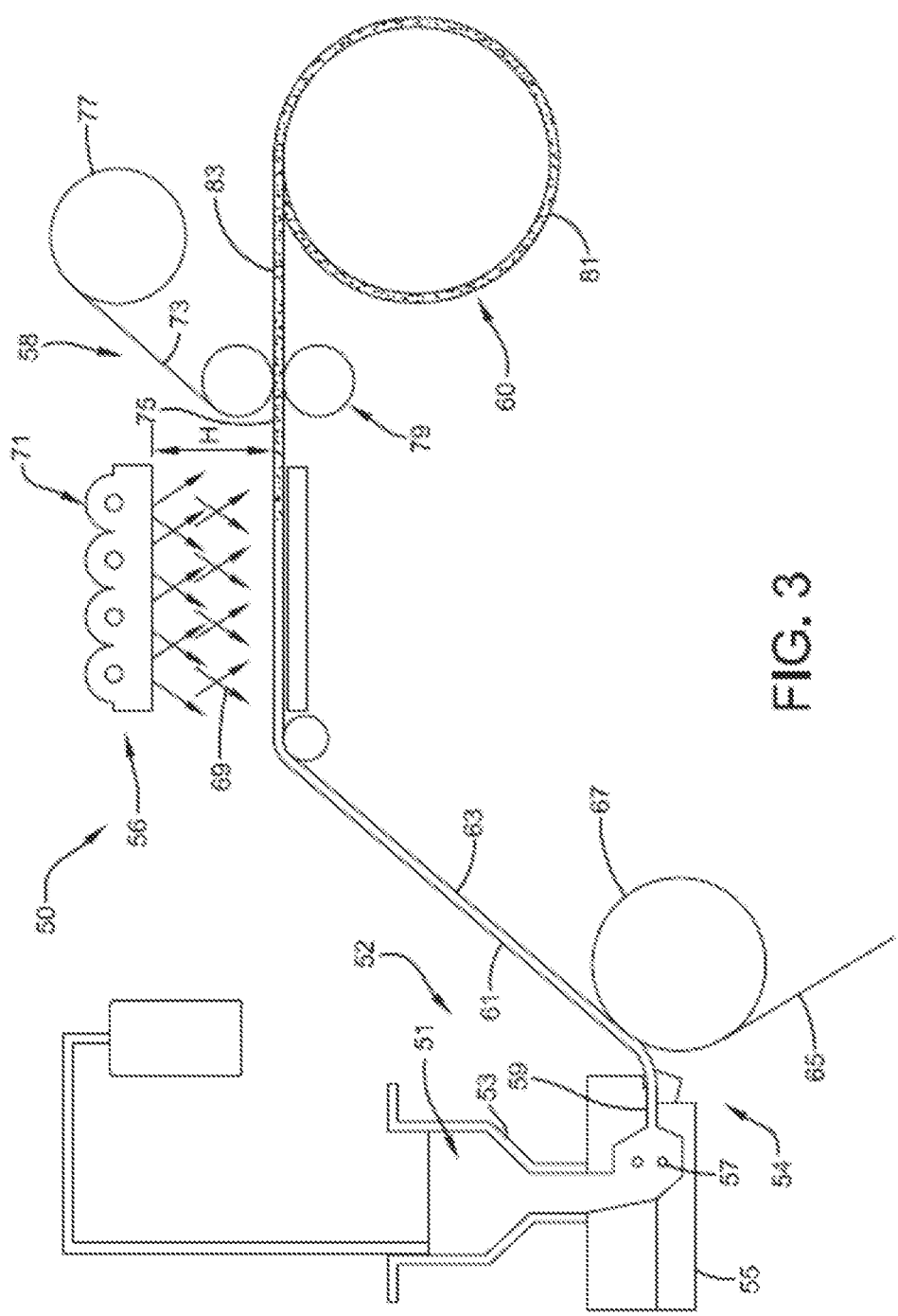
FIG. 3 is a schematic of a continuous process for making membrane composite according to the present invention.

As shown in FIG. 3, coating step 54 can include a roll-coating operation, where adhesive 51 is applied to membrane 65 while membrane 65 is at least partially wound around a coating mandrel 67. Membrane 65 carrying coating layer 61 is fed to a crosslinking step 56, where coating layer 61 of adhesive 51 is subjected to a desired dosage of UV radiation 69, which may be supplied by one or more UV lamps 71. UV lamps 71 may include, for example, mercury-type UV lamps or LED UV lamps. As the skilled person appreciates, the desired dosage of UV energy can be supplied to coating 61 by adjusting the UV intensity and exposure time. The intensity can be manipulated by the power supplied to the respective lamps and the height (H) that the lamps are placed above the surface of coating 61 of adhesive 51. Exposure time can be manipulated based upon the line speed (i.e., the speed at which membrane 65 carrying coating layer 61 is passed through UV curing step 56).

Following UV curing step 56, release paper 73 may be applied to upper surface 75 of coating layer 61 within release paper application step 58. As shown in FIG. 3, release paper 73 may be supplied from a mandrel 77 and removably mated to upper surface 75 through pressure supplied by nip rolls 79. After application of release paper 73, the composite product may be wound within winding step 60 to provide wound rolls 81 of composite products 83.

Characteristics of Composite Membrane

In one or more embodiments, the bond between the layer of crosslinked pressure-sensitive adhesive disposed on a surface of the membrane and the membrane of an existing membrane surface according to the present invention may be characterized by an advantageous peel strength. In one or more embodiments, the peel strength of the bond between the layer of crosslinked pressure-sensitive adhesive disposed on the membranes and the existing membrane may be characterized by a peel strength, as determined according to Pressure Sensitive Tape Council (PSTC) 101, of at least 3.0, in other embodiments at least 3.5, and in other embodiments at least 4.0 pounds per linear inch (pli). In these or other embodiments, the peel strength may be from about 3.0 to about 25 in other embodiments from about 3.5 to about 20, and in other embodiments from about 4.0 to about 18 pli.

In one or more embodiments, the bond between the layer of crosslinked pressure-sensitive adhesive disposed on a surface of the membrane and the existing membrane may be characterized by an advantageous dead load shear. In one or more embodiments, the dead load shear of the bond between the layer of crosslinked pressure-sensitive adhesive disposed on the membranes of the present invention and the existing membrane may be characterized by a dead load shear, as determined according to PSTC 107, of at least 0.5 hour (time of failure), in other embodiments at least 1.0 hour, and in other embodiments at least 1.5. In these or other embodiments, the dead load shear may be from about 2.0 to about 2.5 hours.

Method of Reroofing

In one or more embodiments, the method of reroofing includes providing the membrane composite, optionally preparing the roof surface, positioning the membrane composite over the roof surface, removing the release member, and mating the adhesive layer to the existing membrane.

In one or more embodiments, the roof surface may be prepared by removing debris from the surface of the existing membrane. This may include using conventional means such as sweeping or blowing (e.g. with the use of power blower) to remove debris from the membrane surface. In addition thereto or in lieu thereof, water may be employed to assist in the removal of debris. This may include the use of a high-pressured water spray (e.g. power washer). In particular embodiments, the existing membranes can be washed using cleaning products such as those available from Firestone Building Products, LLC under the tradename Membrane PreWash.

Once the roof surface has been optionally prepared, the membrane composites of the present invention can be secured to the existing roof membrane by using standard peel-and-stick techniques, which include positioning the membrane, removing the release member, and mating the adhesive layer to the roof surface (i.e. to the existing membrane).

Roof System

In one or more embodiments, practice of the present invention provides roof surface that includes an existing membrane secured to the roof deck, and a second membrane secured to the first membrane through the factory-applied adhesive layer described herein.

Various modifications and alterations that do not depart from the scope and spirit of this invention will become apparent to those skilled in the art. This invention is not to be duly limited to the illustrative embodiments set forth herein.

What is claimed is:

1. A method of reroofing an existing roof system including an existing membrane, the method comprising:
   (i) providing a membrane composite, where the composite includes a polymeric membrane and an adhesive layer disposed on a planar surface of the membrane, where the polymeric membrane is selected from the group consisting of EPDM, TPO, and PVC membranes, where the adhesive layer is applied to the membrane as a hot-melt adhesive and is at least partially cured by UV radiation such that the adhesive is not thermally processable and is characterized by an infinite polymer network, where the adhesive layer has a thickness of from about 2 to about 15 mil, the composite further comprising a release member removably attached to the adhesive layer;
   (ii) removing debris from the existing membrane;
   (iii) after said step of removing debris, washing the existing membrane;
   (iv) removing the release member from said composite; and
   (v) adhering the composite to the existing membrane by mating the adhesive layer to the membrane.

2. The method of claim 1, where the adhesive layer includes a polyacrylate adhesive.

3. The method of claim 2, where said step of removing debris includes blowing the debris with a power blower.

4. The method of claim 3, where said step of washing includes applying water and a cleaning solution.

5. The method of claim 1, where said step of adhering the composite to the existing membrane creates a bond having a peel strength, as determined by PSTC 101, of at least 3.0 pli.

6. The method of claim 1, where said step of adhering the composite to the existing membrane creates a bond having a peel strength, as determined by PSTC 101, of at least 3.5 pli.

7. The method of claim 1, where said step of adhering the composite to the existing membrane creates a bond having a dead load shear, as determined by PSTC 107, of at least 0.5 hour.

8. The method of claim 1, where said step of adhering the composite to the existing membrane creates a bond having a dead load shear, as determined by PSTC 107, of at least 1.0 hour.

* * * * *